Patented Feb. 12, 1952

2,585,497

UNITED STATES PATENT OFFICE 2,585,497

SOLUBLE ONIUM SALTS OF HALOGEN-METHYLATED THIOINDIGOS

David I. Randall and Carl M. Smith, Easton, Pa., assignors to General Aniline & Film Corporation, New York, N. Y., a corporation of Delaware No Drawing. Application December 30, 1949, Serial No. 136,154

6 Claims. (Cl. 260—332)

This invention relates to the manufacture of new dyestuffs from the halogenmethyl derivatives of thioindigoid dyes.

In our copending application Serial No. 135,518, filed December 28, 1949, now U. S. Patent No. 2,545,497, issued March 20, 1951, we have described the halogenmethyl derivatives of thioindigos and their preparation. It was pointed out in said application that the halogenmethyl derivatives of some of the thioindigos have substantive dyeing properties and that all of the halogenmethyl derivatives may be used as intermediates for the preparation of soluble dyes. It is to the preparation of such dyes that this application is directed.

Any halogenmethyl derivative of a thioindigo may be converted to a soluble dye by this process, which comprises reacting halogenmethyl thioindigo with a thiourea compound or a tertiary amine. The reaction proceeds in accordance with one of the following schemes:

(1)

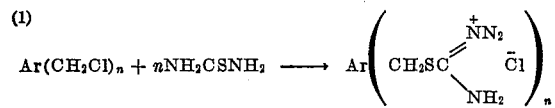

(2)
$$Ar(CH_2Cl)_n + nN(CH_3)_3 \longrightarrow Ar(CH_2\overset{+}{N}(CH_3)_3\overset{-}{Cl})_n$$

where Ar is the radical of a thioindigo compound and $n$ is an integer from 1 to 3. The thiourea may be replaced by thiourea derivatives such as 1-allylthiourea, 1-methylthiourea, 1-phenylthiourea, 1,3-dimethyl-1, 1,3-ethylene-, 1,1,3-trimethyl-, and 1,1,3,3-tetramethylthiourea. The trimethylamine may be replaced by tertiary amines such as pyridine, picoline, isoquinoline, quinoline, diethylaminoethyl alcohol, triethylamine, and benzyldimethylamine.

The more soluble and the more desirable isothiouronium salts are those derived from trimethyl- and tetramethylthiourea. To insure sufficient solubility, it is necessary that the halogenmethylated thioindigo contain on the average at least one halogenmethyl group. Prints made from the isothiouronium salts of the chlormethylated thioindigos exhibit bright shades and possess excellent fastness to chlorine, washing, and light. The prints obtained from the pyridinum salts of the chlormethylated thioindigos exhibit fair fastness to chlorine and washing, but are inferior to the isothiouronium salts in light fastness.

The isothiouronium salts of the chlormethylated thioindigos are prepared by heating the chlormethylated thioindigo in a paste form with thiourea or a thiourea derivative over a steam bath with additions of water and frequent stirring for a period of about one hour. The reaction mixture is then diluted with acetone or water, filtered, and slurried or washed with acetone. The product is air dried. The resulting dyes are water soluble and are substantive to paper, cotton, silk, nylon, and wool. They may be paste printed on cotton, silk, and nylon, and developed by vat or acid aging methods well known to the art. The isothiouronium salts of the thioindigos may be represented by the formula:

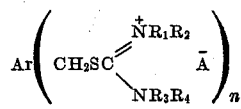

wherein Ar is the radical of a thioindigo compound; R1, R2, R3, and R4 are members of the group consisting of alkyl, alkylene, aryl and hydrogen, of which R2 and R4 may together form a closed ring system; $n$ is an integer from 1 to 3; and A indicates a negative ion, such as chlorine, bromine, or sulfate.

The quaternary salts of the chlormethylated thioindigos are prepared by entirely heating the chlormethylated thioindigo with a tertiary amine. The resulting quaternary salts may be represented by the formulae:

(1)
$$Ar(CH_2\overset{+}{N}Q_1Q_2Q_3\overset{-}{A})_n$$

(2)
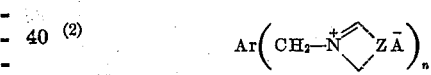

wherein Ar has the same meaning as above; Q1, Q2, and Q3 are members of the group consisting of alkyl, alkylol, and alkaryl; Z indicates the C atoms necessary to complete a 6-membered ring system; A and $n$ have the same meanings as above. Print dyeings may be made from these quaternary salts of the chlormethylated thioindigos in the same manner as in the case of the isothiouronium salts and will dye directly from aqueous solutions. Both the isothiouronium and quaternary salts are also useful as bactericides, fungicides, and insecticides.

As starting materials for the production of the isothiouronium and quaternary salts, the class of chlormethylated thioindigos described in our copending application Serial No. 135,518, filed December 28, 1949, are preferred. This class may be represented by the formulae:

(1)

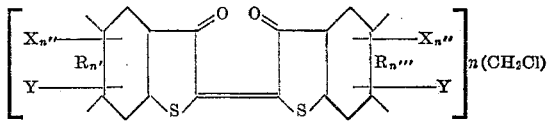

(2)

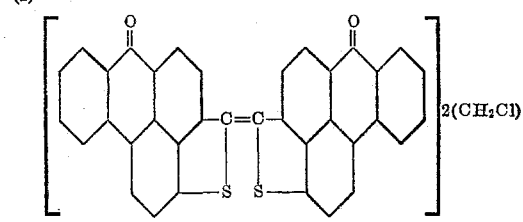

wherein R is a fused 6-membered hydrocarbon ring system; $n'$ and $n'''$ are integers from 0 to 2; X and Y are members of the group consisting of H, alkyl, and halogen; $n''$ is an integer from 1 to 2; and $n$ is an integer from 1 to 3.

The following examples will serve to further illustrate this invention but are not intended to in any way limit its scope. Unless otherwise stated, the parts are by weight.

Example 1

In a casserole 2.5 parts by weight of 5,5'-dichloromethyl-6,6'-dichloro-4,4'-dimethyl thioindigo obtained by the process of our copending application Serial No. 135,518, filed December 28, 1949, as a 16.4% paste was stirred with 4.0 parts by weight trimethyl thiourea and heated on a steam bath. The paste rapidly thinned out and changed shade from Brilliant Scarlet to purple. After one hour on the steam bath with additions of water and frequent stirring the reaction mixture was diluted with acetone and triturated twice with more acetone, filtered and washed with acetone and dried in a vacuum desiccator. Yield=3.8 g. purple powder, completely soluble in water which gave attractive violet prints. The isothiouronium product has the formula:

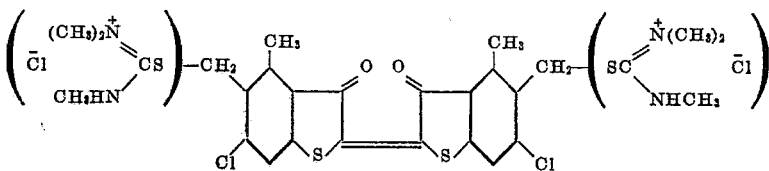

Example 2

A mixture of 3.0 parts by weight of dichloromethyl-Δ-2,2' - (3,3') - binaphtho[2,1 - b]thiophen-3-one, obtained by the process of our copending application Serial No. 135,518, filed December 28, 1949 and acetone was ballmilled to a fine dispersion and mixed into a casserole and the acetone evaporated. Water was added and 4.0 parts by weight trimethyl thiourea. The mass was heated and stirred on the steam bath for one hour. It became very thick and dark in color. The mix was then diluted with acetone, twice triturated with acetone, filtered, and washed with acetone. Yield=4.0 g. dark brown powder almost completely soluble in water giving sharp clean brown prints. This isothiouronium product has the formula:

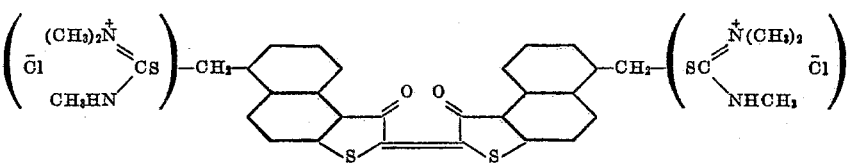

Example 3

In a casserole on the steam bath 21.0 parts by weight of 6,6' - dichloromethyl - 5,5' - dichloro-7,7'-dimethylthioindigo, obtained by the process of our copending application Serial No. 135,518, filed December 28, 1949, as a paste was stirred with 30.0 parts by weight of dimethyl thiourea. The mass rapidly thinned up, but after three hours had become very thick. It was diluted with hot water and filtered; the filtrate and washings evaporated and thrown into acetone on a Waring Blendor. After filtering and reslurrying with acetone, the product was filtered and air dried. Yield=8.5 g. violet powder giving violet prints. This isothiouronium product has the formula:

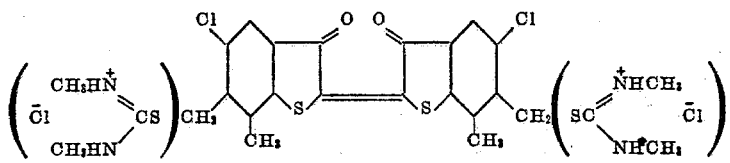

Example 4

A mixture of 15.0 parts by weight chloromethyl-9-chloro-2-[5-bromo - 3 - oxo - 2(3) - indolylidene]naphtho[1,2-b]thiophen - 3 - one, obtained by the process of our copending application Serial No. 135,518, filed December, 1949, 25.0 parts by weight dimethyl thiourea and sufficient water to make a paste was tumbled in a bottle with stones for 1 hour. The paste was then rinsed into a casserole on a steam bath and heated for one hour with frequent stirring. The product was slurried twice in a Waring Blendor with acetone, filtered and air dried. Yield=17.0 g. blue grey powder almost completely soluble in water giving grey blue prints. This isothiouronium product has the formula:

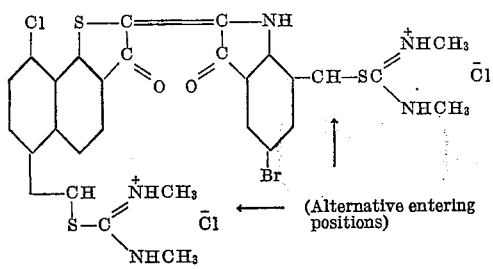

Example 5

A reaction mixture, consisting of 5 g. of 5,5′,6,6′-tetramethyl - 7,7′ - chloromethylthioindigo, obtained by the process of our copending application Serial No. 135,518, filed December 28, 1949, 8 g. of 1,1,3,3-tetramethylthiourea and 80 ml. of water, was heated at 90° C. for one hour and then cooled. The product was precipitated by the slow addition of 400 ml. of acetone; 8.9 g. It prints cotton in strong bright violet shades with good fastness properties. A mixture of 60% of this compound and 40% of Alcian Blue prints cotton in bright blue shades of excellent fastness. This isothiouronium product has the formula:

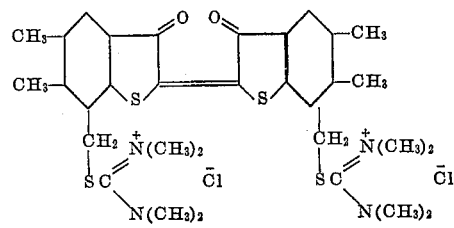

Example 6

A mixture of 100 parts by weight of chloromethylated thioindigo, obtained by the process of our copending application Serial No. 135,518, filed December 28, 1949, 135 parts trimethyl thiourea, and 380 parts water are heated at 90–95° C. 40 minutes. At 80° C. the solution is poured slowly into 1 liter of acetone containing 100 cc. water. After stirring rapidly ½ hour, the precipitated isothiouronium salt is filtered off and washed with acetone. On printing cotton strong shades of pink of excellent fastness to wash and chlorine are obtained. This product has the formula:

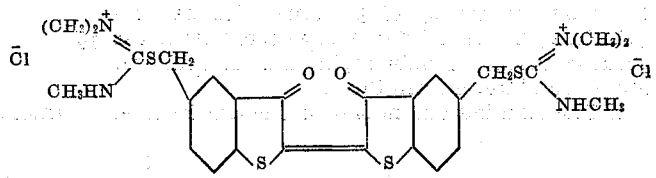

Example 7

100 parts of chloromethylatedΔ2,2′(5,5′)-bianthra [2,1,9-cde] thionaphthene-5-one, obtained by the process of our copending application Serial No. 135,518, filed December 28, 1949, are mixed with 135 g. of 1,3-dimethyl thiourea and 500 ml. of water, mechanically stirred and heated under reflux for ten minutes. The resulting green solution is cooled to 50° C. and then poured into 1000 ml. acetone. Collecting the precipitated green solid on a filter, washing several times with acetone, drying by exposure and hammer-milling yields 100 g. of product. It prints cotton from an aqueous solution a bright green color of good fastness to light, chlorine, and washing. This product has the formula:

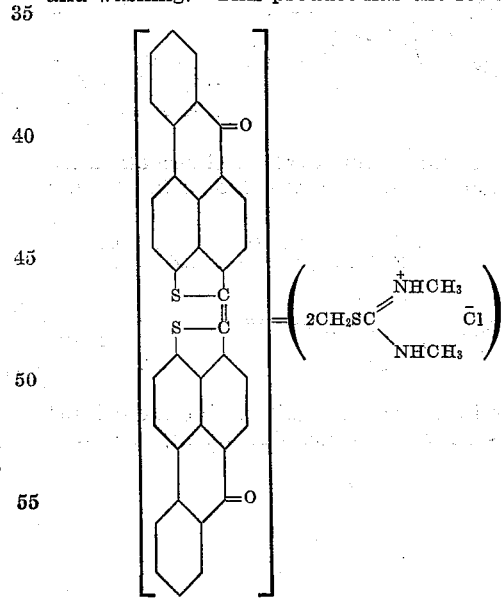

We claim:
1. The soluble onium salts of halogenmethylated thioindigo dyes of the class consisting of those having the formulae:

(1)

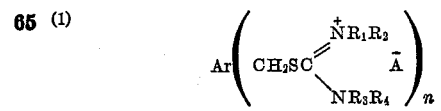

(2)

and (3)

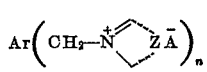

wherein Ar is the radical of a thioindigo compound; R1, R2, R3, and R4 are members of the group consisting of alkyl, alkylene, phenyl and hydrogen of which R2 and R4 may together form a closed ring system; Q1, Q2, and Q3 are members of the group consisting of alkyl, alkylol, and benzyl; Z indicates the C atoms necessary to complete a 6-membered ring system selected from the group consisting of pyridine, picoline, isoquinoline and quinoline; A is selected from the group consisting of chlorine, bromine and sulfate; and $n$ is an integer from 1 to 3.

2. The isothiouronium salt of chlormethylated 4,4'-dimethyl-6,6'-dichloro - thioindigo having the formula:

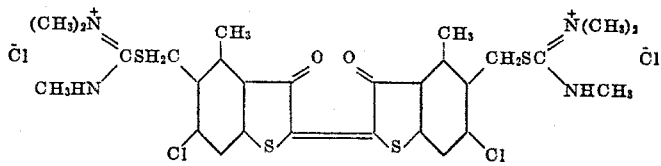

3. The isothiouronium salt of chlormethylated Δ-2,2'(3,3')-binaphthol[2,1-6]thiophen - 3 - one having the formula:

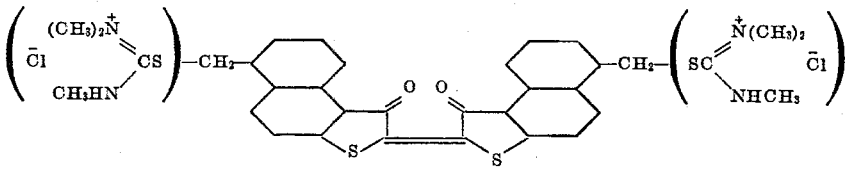

4. The isothiouronium salt of chlormethylated 5,5'-dichloro-7,7'-dimethylthioindigo having the formula:

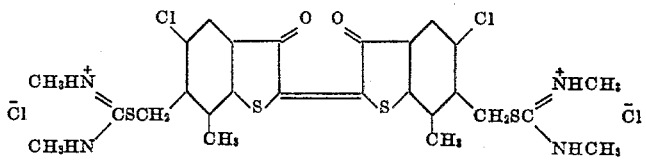

5. The isothiouronium salt of chlormethylated 5,5'-6,6'-tetramethylthioindigo having the formula:

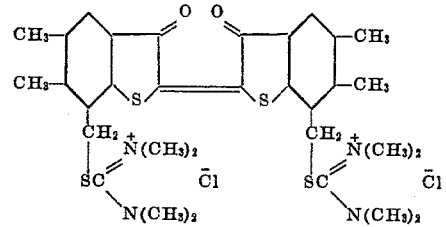

6. The isothiouronium salt of chlormethylated thioindigo having the formula:

DAVID I. RANDALL.
CARL M. SMITH.

No references cited.